Sept. 22, 1970     A. KATCHMAN     3,530,344
ELECTRICAL CAPACITOR

Original Filed June 29, 1967     2 Sheets-Sheet 1

INVENTOR:
ARTHUR KATCHMAN,
BY James J. Lichiello
HIS ATTORNEY.

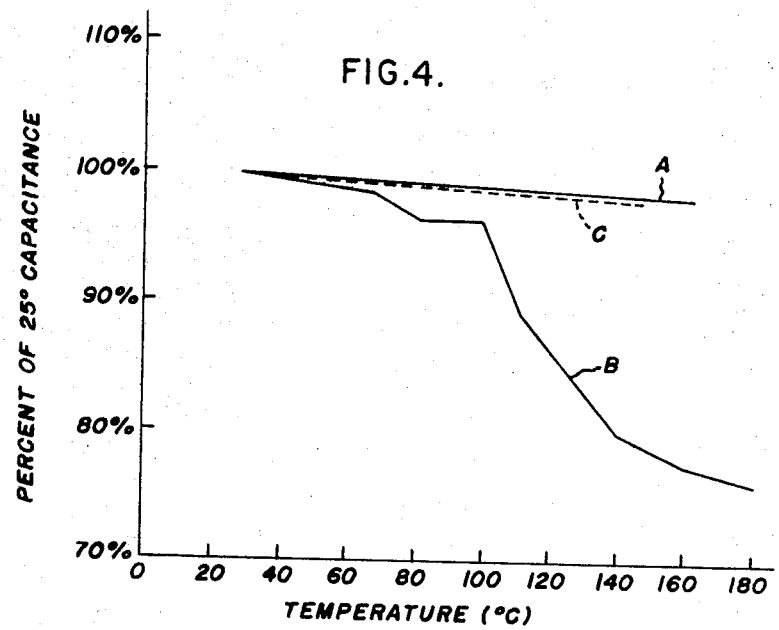
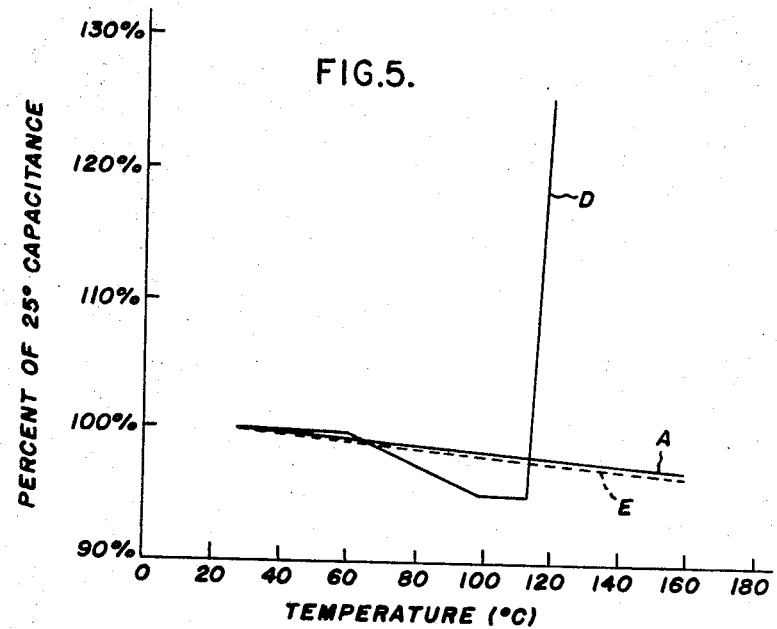

United States Patent Office 3,530,344
Patented Sept. 22, 1970

3,530,344
ELECTRICAL CAPACITOR
Arthur Katchman, Delmar, N.Y., assignor to General
Electric Company, a corporation of New York
Continuation of application Ser. No. 649,922, June 29,
1967. This application Mar. 12, 1969, Ser. No. 806,416
Int. Cl. H01g 3/21
U.S. Cl. 317—258                                    10 Claims

ABSTRACT OF THE DISCLOSURE

An electrical capacitor incorporates a resinous dielectric material which is a polyblend of a polyphenylene oxide and polystyrene. A particularly favorable dielectric composition is 50% polystyrene-50% poly-(2,6-dimethylphenylene-1,4) ether.

This application is a continuation application of copending application Ser. No. 649,922, Katchman, filed June 29, 1967, and now abandoned.

BACKGROUND OF THE INVENTION

Field of the invention

The present invention relates to electrical capacitors and more particularly to electrical capacitors incorporating a resinous dielectric material which confers improved electrical properties thereon, especially under conditions of elevated temperature.

DESCRIPTION OF THE PRIOR ART

As is well known in the art, dielectric materials of low dissipation factor are desirable for use in capacitors to avoid energy loss and excessive heat generation which would otherwise cause undue shortening of the life of the capacitor. While various types of dielectric materials are known which may have satisfactory dissipation factors in capacitors operative at normal operating temperatures, such dielectric materials generally do not retain their low dissipation factors in capacitors under conditions of elevated temperature, for example 100° C. and above. Further, many known synthetic resin capacitor dielectric materials generally do not have a sufficiently high softening point to enable them to be used at elevated temperatures, to which electrical capacitors may be subjected under operating conditions. As a result, known dielectric resin materials have generally exhibited thermally unstable electrical properties, particularly capacitance and dissipation factor. This instability can lead to premature failure of capacitors.

SUMMARY OF THE INVENTION

It is, therefore, an object of this invention to provide an improved synthetic resin dielectric capacitor having good electrical properties and being capable of operating at elevated temperatures without significant degradation of these properties.

It is a further object of this invention to provide an improved capacitor having a mixed synthetic resin dielectric material, which material can be easily fabricated into films, is relatively inexpensive and which confers improved electrical properties upon the capacitor, especially low dissipation factor and capacitance stability under conditions of elevated temperature, over a wide range of temperatures.

Other objects and advantages will become apparent from the following description and appended claims.

It has been found that a particularly advantageous capacitor having a low dissipation factor and exhibiting markedly stable electrical properties, e.g., capacitance, at elevated temperatures can be obtained by the use of a dielectric material comprising a polyblend of polystyrene and a polyphenylene oxide. Such a polyblend possesses, in large part, the exceptional electrical characteristics of the polyphenylene oxide component and the beneficial mechanical properties imparted by the polystyrene component. Further it has been found that the desirable electrical characteristics of the polyblend are increased over those which would be predictable based upon the proportional amount of polyphenylene oxide present and its electrical characteristics.

The results obtained are particularly surprising in view of the fact that each component taken alone has significant drawbacks, affecting its desirability as a dielectric material. Polyphenylene oxide film dielectrics are extremely brittle, difficult to fabircate and quite costly. Polystyrene's major limitation is that it begins to soften and melt in the temperature range 70 to 80° C.

In its broadest form, the present invention relates to an electrical capacitor comprising a pair of electrodes separated by dielectric material comprising a polyblend of polyphenylene oxide, such as poly-(2,6-dimethylphenylene-1,4) oxide, and polystyrene. In a preferred embodiment, the dielectric material comprises at least about 50% by weight of polyphenylene oxide. A particularly suitable dielectric composition is about 50% by weight polystyrene and about 50% by weight polyphenylene oxide.

BRIEF DESCRIPTION OF THE DRAWINGS

The invention will be better understood from the following description taken in conjunction with the accompanying drawings:

FIGS. 4 and 5 graphically illustrate a superior electrical characteristic of a capacitor constructed in accordance with the present invention.

DESCRIPTION OF THE PREFERRED EMBODIMENTS

Figure 1:
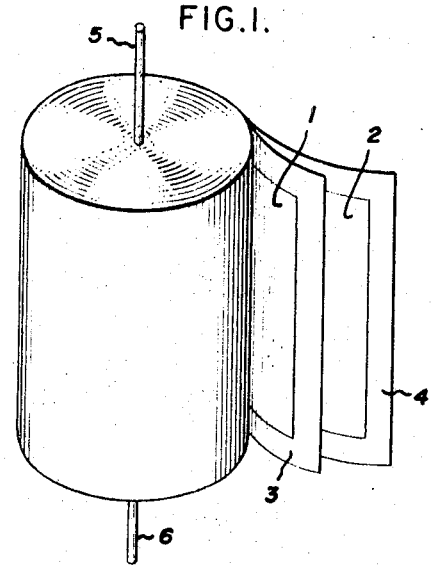
FIG. 1 illustrates an electrical capacitor incorporating an improved dielectric material in accordance with the present invention.

Referring now to the drawings and particularly to FIG. 1, there is shown a roll type capacitor comprising a pair of convolutely wound electrode foils 1 and 2 of suitable metal, e.g., aluminum, copper, or tantalum insulated from each other by separate sheets 3 and 4 of dielectric material of the composition hereinafter described. The particular polyblend dielectric material described herein is capable of being tightly wound without brittle fracture or other degradation of the integrity of the film. Electrical contact with electrode foils 1 and 2 is made by terminal leads 5, 6 of electrically conducting material which are applied to the respective foil electrodes and which project from opposite ends of the wound capacitor section.

Figure 2:
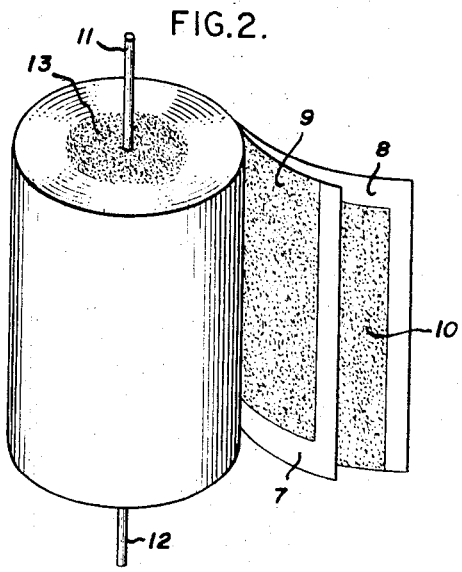
FIG. 2 illustrates a different embodiment of electrical capacitor incorporating the improved dielectric material.

In a different form of capacitor as shown in FIG. 2, the wound capacitor comprises a pair of convolutely wound dielectric films 7, 8, similar to dielectric films 3, 4, of FIG. 1, but having metallized coatings 9, 10 respectively thereon serving as the capacitor electrodes. The metallized electrode coatings may be composed of aluminum or any other suitable conducting material such as tin, silver, copper, lead, zinc, or nonmetallic solid conductive material such as carbon, and may be applied by metallizing or other suitable metal depositing techniques. A satisfactory metal coating may be produced, for example, by vacuum evaporation of the desired metal, or sputtering, dripping, pinking, chemical deposition, or the like. As shown, the margins at the opposite edges and the end of dielectric films 7, 8 are left free of metal coating to avoid the risk of short-circuiting between electrodes of opposite polarity. Terminals 11, 12 are electrically connected to the metallized coating edges exposed at opposite ends of the roll by a metal connection 13 produced by a schooping, soldering or other suitable process, as is well known in the art.

Figure 3:
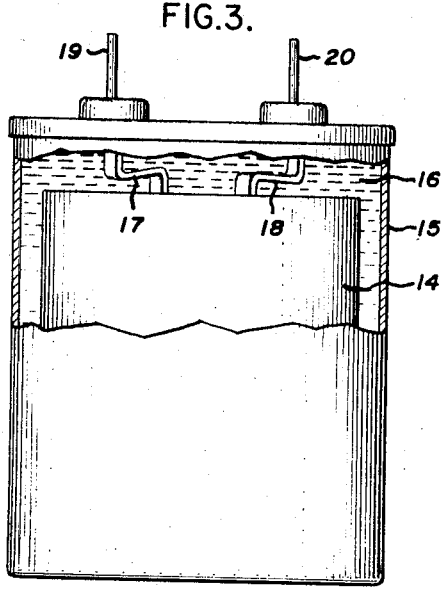
FIG. 3 illustrates still another form of electrical capacitor which may incorporate the improved dielectric material.

FIG. 3 shows a capacitor assembly in which a wound capacitor section 14, such as the wound section shown in FIG. 1 or FIG. 2, is enclosed in a casing 15, usually metal, containing a dielectric liquid which is compatible with the synthetic resin polyblend dielectric composition of the present invention. Suitable dielectric liquids include trichlorodyphenyl, silicone oil, ester fluids, cotton seed oil, and the like. Tap straps 17, 18 connected within the capacitor section to electrodes of different polarity are respectively connected to external terminals 19, 20 suitably mounted on the cover of the casing.

While the synthetic resin sheet dielectric material shown in FIGS. 1 and 2 is used as the sole dielectric material, the synthetic resin sheet may be used in conjunction with other materials such as kraft paper and other types of dielectric sheets to provide a complex dielectric spacer system, particularly, but not exclusively, where the auxiliary spacer material is porous and used for the purpose of enabling improved distribution of impregnating liquids in capacitors. The polyblend dielectric material may be used with other materials, such as sheet mica, or with fillers such as finely divided aluminum oxide or silica flour. If desired, the dielectric spacer material between capacitor electrodes may be in the form of paper or other porous insulating sheets such as glass cloth, asbestos, or textile cloth impregnated and/or coated with the described resin dielectric composition. The capacitors incorporating the described resin composition may be employed in dry form or impregnated with liquid dielectrics as shown in FIG. 3, or impregnated with hardenable liquid dielectric materials of known or suitable type which are cured to provide a final capacitor unit with composite solid dielectric, as disclosed, for example, in U.S. Pat. 2,864,982 Ruscetta et al., assigned to the same assignee as the present invention.

The described dielectric films may have conducting layers deposited thereon by known metallizing processes to provide electrodes on their surface, either when in the form of self-supporting films as shown in FIG. 2, or in the form of coatings on a metal base.

The dielectric spacer material separating the capacitor electrodes is composed of a polyblend of a polyphenylene oxide material and a polystyrene material. The proportion of each of the components of the polyblend is dependent upon the results desired, since the amount of polyphenylene oxide which may be blended with polystyrene is variable over essentially the full range of blends as the two polymers are compatible over their full range of concentration.

The polyphenylene oxide employed in this invention has a repeating structural unit of the formula

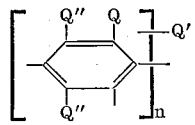

wherein the oxygen atom of one unit is connected to the benzene nucleus of the adjoining unit, $n$ is a positive integer and is at least 100, Q is a monovalent substituent selected from the group consisting of hydrogen, hydrocarbon radicals free of a tertiary α-carbon atom, halohydrocarbon radicals having at least two carbon atoms between the halogen atom and the phenol nucleus and being free of a tertiary α-carbon atom, hydrocarbonoxy radicals being free of a tertiary α-carbon atom, and halohydrocarbonoxy radicals having at least two carbon atoms between the halogen atom and phenol nucleus and being free of a tertiary α-carbon atom, Q' and Q'' are both monovalent substituents which are the same as Q and, in addition, halogen.

The polyphenylene oxides used in practicing the present invention and the methods of making the same are more fully disclosed in U.S. Pats. 3,306,874 Hay, and 3,306,875 Hay, and in copending application Ser. No. 593,733 filed Nov. 14, 1966, now U.S. Pat. 3,432,466, each assigned to the same assignee as the present invention.

For the purposes of the present invention, the higher molecular weight polyphenylene oxide products where the molecular weight is at least about 10,000 are preferred. The maximum molecular weight is limited only by the ability to fabricate and form the polymer material for the desired purposes.

The polystyrene material with which the polyphenylene oxide is mixed is preferably polymerized unsubstituted styrene. However, it also may include polymerized substituted styrene monomers with substituent groups according to the following formula:

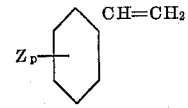

In this formula, Z is a member selected from the class consisting of hydrogen, halogen, alkyl and alkoxy radicals and $p$ is a whole number ranging from 0 to 3.

As used herein, the term polystyrene is meant to include not only polymerized unsubstituted styrene but also polymerized substituted styrene monomers, such as, for example, those indicated above in defining the Z components of the monomer and copolymers thereof.

In the preferred form, wherein polymerized unsubstituted styrene is used in the polyblend, this invention contemplates the use of either amorphous polystyrene or crystalline polystyrene. Commercially available amorphous polystyrene may be advantageously used in preparing the dielectric films of the present invention. An example of an acceptable commercially available polystyrene is that available from the Dow Chemical Company and identified as Dow Polystyrene 595,467. Crystalline polystyrene may be prepared using stereospecific catalysis.

The polyblends of the present invention and the methods of making the same are more fully disclosed in copending application Ser. No. 423,702 filed Jan. 6, 1965, now U.S. Pat. 3,383,435, and assigned to the same assignee as the present invention.

Polyphenylene oxide-polystyrene polyblends used as dielectric material for capacitors in accordance with the invention may be extruded, rolled, pressed or cast from solution to form thin films. They may also be applied as dielectric coatings to the surfaces of electrode foils from solution or suspension, or by fluidized bed coating methods well known in the art. Thus, resin coated electrode foils may be provided wherein the dielectric resin coating is applied to the surfaces of each foil with exposed metal margins at opposite sides of the wound roll, as shown for example in U.S. Pat. 2,995,688 Rosenberg, assigned to the same assignee as the present invention.

In order to improve the mechanical properties of resinous films, it is common to impart some form of ordered structure to such films by stretching them. Preferably this stretching is done in perpendicular directions, i.e., both longitudinally and transversely of the film length, so as to impart a biaxial orientation to the film. Samples of film of the present invention, comprising both amorphous polystyrene-polyphenylene oxide blends and crystalline polystyrene-polyphenylene oxide blends, were prepared by various techniques and the prepared films were metallized to permit measurement of their electrical properties.

For example, dielectric films were prepared by placing a mixture of polystyrene and polyphenylene oxide in the desired proportions in a Carver press, heating to a temperature from about 150° C.–285° C. between aluminum foils and pressing at a pressure of from about 2000 pounds per square inch (p.s.i.) to 20,000 p.s.i.

Films were also prepared by extrusion from pellets and by solvent casting. Solvent cast films were prepared by solutioning polystyrene and polyphenylene oxide in chloroform (USP grade). The solution was filtered through a 1.2μ millipore filter and cast on a glass plate in a clean box using a motorized Gardner Knife. The solvent was evaporated over a sixteen to twenty-four hour period and the film was stripped from the plate and vacuum dried for 24 hours at 50° C.

Dielectric film samples of the polyblend regardless of the technique employed in their formation, were then metallized with gold in a circle of from 1-inch to 3-inch diameter by vapor deposition. The samples were placed in a test cell and heated to from about 65° C.–140° C., depending on sample composition, at 40–100 microns pressure, for about 16 hours. They were then allowed to stabilize at this temperature for thirty minutes in a dry nitrogen atmosphere. While remaining in this dry nitrogen atmosphere, heating of the samples was terminated and the samples were allowed to slowly cool to room temperature.

FIG. 4 graphically illustrates the improved capacitance stability of capacitors incorporating the polyblend described herein. Curve A represents the stability of polyphenylene oxide film dielectric. As is disclosed in U.S. Pat. 3,292,061 Eustance, assigned to the same assignee as the present invention, polyphenylene oxide is an extremely stable polymer material over a wide range of temperatures and particularly at elevated temperatures. Curve B represents crystalline polystyrene. Its capacitance is relatively constant with temperatures up to about 100° C. Up to 180° C. the crystalline polystyrene exhibits a negative temperature coefficient of capacitance. Beyond 180° C. viscosity considerations cause the material to take on a positive coefficient because the crystalline melt temperature is in this region. Curve C represents a poly blend of 50% polyphenylene oxide and 50% crystalline polystyrene in accordance with a preferred embodiment of the present invention. As can be seen from the graph, the polyblend stability approximates that of the polyphenylene oxide. This result is surprising since one would surely have expected the 50% polystyrene to have a proportionate influence upon the stability of the polyblend.

FIG. 5 is similar to FIG. 4 except that it graphically illustrates the unexpected thermal stability of capacitance of a polyblend comprising amorphous polystyrene and polyphenylene oxide. Curve A represents polyphenylene oxide. Curve D reresents amorphous polystyrene. The sharp increase in capacitance which can be seen in the 110° C. temperature region is attributable to melting and "squeeze out" of the film from between the electrodes, thus reducing its thickness. Curve E represents a polyblend of 70% polyphenylene oxide and 30% amorphous polystyrene in accordance with the present invention. Once again it is noteworthy that the stability of the polyblend is substantially the same as that of the polyphenylene oxide. The temperature effect of the relatively unstable polystyrene, which one would expect to influence the stability of the polyblend, is not observed.

Not only do the electrical capacitors of the present invention exhibit unexpected thermal stability of capacitance, but they also display a consistently low and stable dissipation factor with changes in temperature. More specifically, the use of the polyblend has permitted the extension of low dissipation factor characteristics to any temperature up to about 200° C. depending upon the polyblend composition selected. Heretofore, the degradation of good electrical properties with increasing temperature had posed a problem in the selection of dielectric materials. Due to polystyrene's low softening temperature, it becomes undesirable for capacitors operating above about 80° C., and is only marginally useful above 60° C. On the other hand, although polyphenylene oxide dielectric materials show a favorable dissipation factor up to about 200° C. their poor workability, brittle characteristics and cost make them commercially unpopular.

It has been found that by selection of the proper proportions of polystyrene and polyphenylene oxide, a desirable balance can be struck between workability, cost and electrical properties. For example, a 50% amorphous polystyrene-50% polyphenylene oxide blend retains a low and stable dissipation factor up to about 120° C. A similar blend containing 70% polyphenylene oxide is useful up to about 170° C. Where only a slight improvement in workability and cost is sought, but where it remains necessary for the chosen dielectric to have excellent high temperature properties and operability over a broad temperature range, it has been found that the addition of small amounts of amorphous polystyrene, for example 5–10%, results in a material useful up to 180–190° C. Similarly small additions of polyphenylene oxide to polystyrene may be appropriate where only slightly improved high temperature characteristics are required.

Tests conducted upon samples of crystalline polystyrene-polyphenylene oxide polyblends have shown that the polyblends, in some instances, have better dissipation factor properties than even polyphenylene oxide dielectric alone. Peaks have been observed, at 125° C., in the dissipation factor characteristics of polyblends containing crystalline polystyrene. This is attributable to a second order transition occurring in this temperature range. For most AC applications, the slight rise in dissipation factor at these peaks can be neglected and the material considered useful over a very wide range of temperatures. For example, although a 50% crystalline polystyrene-50% polyphenylene oxide blend shows a dissipation factor peak of about 0.2 at about 125° C., the factor rapidly drops back to about 0.1 and remains stable at that value up to about 190° C. Above about 140° C., the dissipation factor of the 50%–50% polyblend appears to be lower than that of polyphenylene oxide alone. Such a blend therefore displays both the beneficial electrical characteristics of polyphenylene oxide dielectrics and the workability of polystyrene dielectric. Other blends of crystalline polystyrene and polyphenylene oxide also display unexpectedly good electrical properties, particularly where the polyphenylene oxide component comprises at least 50% of the polyblend.

The dissipation factor of electrical capacitors including polyblend dielectrics in accordance with the present invention are remarkably stable over a wide range of frequency. This characteristic enhances the value of these capacitors for applications in electronic and other devices designed to operate under widely differing frequencies. It is significant that the remarkable stability and consistently low dissipation factor value has been observed with polyblend dielectrics containing either amorphous or crystalline polystyrene. Further it has been found that the stability of the dissipation factor over a wide range of frequency is substantially unaffected by the composition of the dielectric polyblend.

While the present invention has been described with reference to particular embodiments thereof, it will be understood that numerous modifications may be made by those skilled in the art without actually departing from the scope of the invention.

What is claimed as new and desired to be secured by Letters Patent of the United States is:

1. A capacitor comprising a pair of electrodes and a dielectric spacer therebetween, said dielectric spacer comprising a polyblend of polyphenylene oxide and polystyrene.

2. A capacitor, as claimed in claim 1, wherein said polyphenylene oxide component comprises at least 50% of said polyblend.

3. A capacitor, as claimed in claim 1, wherein said polystyrene component comprises at least 50% of said polyblend.

4. A capacitor, as claimed in claim 1, wherein said polystyrene component comprises amorphous polystyrene.

5. A capacitor, as claimed in claim 1, wherein said polystyrene component comprises crystalline polystyrene.

6. A capacitor, as claimed in claim 1, wherein said polyphenylene oxide is poly-(2,6-dimethylphenylene-1,4) oxide.

7. A capacitor, as claimed in claim 6, wherein said polystyrene component comprises 50% by weight and said polyphenylene oxide component comprises 50% by weight of said polyblend.

8. A capacitor, as claimed in claim 1, wherein said dielectric spacer comprises a biaxially oriented film of said polyblend.

9. A capacitor, as claimed in claim 1, wherein said capacitor is a tightly wound convolute comprising alternating layers of dielectric material and electrode foils.

10. A capacitor, as claimed in claim 1, wherein said dielectric spacer is impregnated with a dielectric fluid.

References Cited

UNITED STATES PATENTS

| | | | |
|---|---|---|---|
| 3,242,401 | 3/1966 | Katchman. | |
| 3,363,156 | 1/1968 | Cox | 317—258 X |
| 3,373,226 | 3/1968 | Gowan | 260—874 |
| 3,383,435 | 5/1968 | Cizek | 260—874 |

ELLIOT A. GOLDBERG, Primary Examiner

U.S. Cl. X.R.

252—64